United States Patent
Ketkaew et al.

(10) Patent No.: US 11,879,569 B2
(45) Date of Patent: Jan. 23, 2024

(54) FLEXIBLE BULK METALLIC GLASS ELEMENTS

(71) Applicant: Supercool Metals LLC, Branford, CT (US)

(72) Inventors: Jittisa Ketkaew, New Haven, CT (US); John Chay, Hamden, CT (US); Jan Schroers, Guilford, CT (US); Evgenia Pekarskaya, New York, NY (US)

(73) Assignee: SUPERCOOL METALS LLC, Branford, CT (US)

( * ) Notice: Subject to any disclaimer, the term of this patent is extended or adjusted under 35 U.S.C. 154(b) by 0 days.

(21) Appl. No.: 17/860,668

(22) Filed: Jul. 8, 2022

(65) Prior Publication Data

US 2023/0015035 A1    Jan. 19, 2023

Related U.S. Application Data

(60) Provisional application No. 63/220,970, filed on Jul. 12, 2021.

(51) Int. Cl.
*F16L 11/15*    (2006.01)
(52) U.S. Cl.
CPC ..................... *F16L 11/15* (2013.01)
(58) Field of Classification Search
CPC .. F16L 11/20; F16L 11/14; F16L 11/15; F16L 11/16; F16L 11/24
USPC ............... 138/118, 119, 121, 122, 178, 177, 138/DIG. 2, DIG. 10
See application file for complete search history.

(56) References Cited

U.S. PATENT DOCUMENTS

| | | | |
|---|---|---|---|
| 4,888,758 A | 12/1989 | Scruggs et al. | |
| 5,288,344 A | 2/1994 | Peker et al. | |
| 7,500,987 B2 | 3/2009 | Bassler et al. | |
| 9,016,324 B2* | 4/2015 | Niccolls | B32B 27/12 138/99 |
| 9,039,755 B2* | 5/2015 | Richter | A61F 2/88 623/1.36 |
| 9,895,742 B2 | 2/2018 | Schroers et al. | |
| 2009/0234433 A1 | 9/2009 | Richter | |
| 2013/0171367 A1* | 7/2013 | Kusinski | B05D 5/083 427/552 |
| 2020/0300413 A1 | 9/2020 | Chay et al. | |

FOREIGN PATENT DOCUMENTS

| | | |
|---|---|---|
| CN | 108754198 B | 12/2019 |
| DE | 102013006009 B3 | 7/2014 |
| DE | 102015206251 A1 | 10/2016 |

(Continued)

OTHER PUBLICATIONS

The International Search Report of PCT/US2022/036621, dated Oct. 7, 2022.

(Continued)

*Primary Examiner* — Patrick F Brinson
(74) *Attorney, Agent, or Firm* — STIP Law Group, LLC (57) ABSTRACT

Flexible BMG elements and methods for making the flexible BMG elements. The BMG element contains a main body made from a BMG material and may further contain a flange. The main body may contain at least one opening. The main body may be a thin-walled structure that is compressible, extendable, and/or bendable. A surface of the main body may be corrugated with a series of ridges and furrows.

21 Claims, 11 Drawing Sheets

(56) References Cited

FOREIGN PATENT DOCUMENTS

| | | |
|---|---|---|
| DE | 102016208929 A1 | 5/2017 |
| EP | 1985388 A1 | 10/2008 |
| JP | H0657226 U | 8/1994 |
| JP | 19982567677 Y2 | 4/1998 |
| JP | 2006021459 A | 1/2006 |
| RU | 2615653 C1 | 4/2017 |
| WO | WO2013/138710 A1 | 9/2013 |

OTHER PUBLICATIONS

Han et al., An investigation of Zr-based bulk metallic glasses as bipolar plates for proton exchange membrane fuel cells, International Journal of Hydrogen Energy, Jan. 24, 2020, vol. 45, Issue 4, pp. 3132-3144, Elsevier, Amsterdam, Netherlands.

Rodrigo Miguel Ojeda Mota et al., Overcoming geometric limitations in metallic glasses through stretch blow molding, Applied Materials Today, Jan. 14, 2020, vol. 19, Issue 100567, pp. 1-8, Elsevier Ltd, Amsterdam, Netherlands.

* cited by examiner

Figure 2

SECTION A - A'

FLEXIBLE BULK METALLIC GLASS ELEMENTS

CROSS-REFERENCE TO RELATED APPLICATIONS

This application claims the benefit of Provisional U.S. Patent Application No. 63/220,970 filed Jul. 12, 2021, the entire disclosure of which is herein incorporated by reference.

BACKGROUND OF THE INVENTION

Flexible metal elements are used to connect two components that must move relative to each other when volume compensation is needed, when components need to be sealed under pressure, when vibration occurs between the two pieces, or to transport liquid or gas under pressure in a sealed environment. Flexible metal elements include bellows, diaphragm bellows, hoses, flexible or bendable pipes, ducts, feedthroughs, and expansion joints. They are used in a wide range of sectors, including industrial, automotive, semiconductor, aerospace, space, medical and energy for various applications, including sealing, pressure gauges and sensors, media storage, and piping expansion joints. They are designed to compress, stretch, extend, and/or bend to absorb axial and angular movements. One example of flexible metal elements is a bellow, a thin-walled cylindrical structure with a corrugated structure.

Generally, flexible metal elements such as bellows, hoses, pipes, ducts and expansion joints can be manufactured by several methods including forming, welding, or electrodeposition. As an example, metal bellows, hose and pipes are produced by reworking a tube feedstock through cold forming, electroforming, or hydroforming. These structures can also be achieved through welding, which are made by welding two or more formed sections. Bellows can also be electroformed or electrodeposited, a process where bellows are manufactured by plating metal onto a machined mandrel or a machined bellow.

A common limitation among all the manufacturing techniques of the flexible metal elements is that these techniques require various procedures that are lengthy, difficult, and unsuitable for most desired engineering structures with the highest performance. Complex metal components, such as the flexible metal elements of interest here, are fundamentally difficult to manufacture. The fundamental challenge with conventional metal manufacturing is inherent to the nature of conventional metals in that conventional metals either exhibit too high strength when they are in their crystalline solid state, or they are too fluid in their liquid state. Therefore, conventional metals lack an optimum processing method or shaping condition. Thus, making a complex part out of a high-strength metal is very difficult, lengthy, expensive and requires multiple steps. Additionally, conventional metal manufacturing is also often accompanied by limitations in design possibilities due to limited abilities to deform metals into complex shapes.

Bulk metallic glasses (BMG) used in the present invention, also known as amorphous metals, are a class of materials that are characterized by their disordered atomic structure, as opposed to an ordered, crystalline atomic structure. Due to their unique structure, they exhibit various desirable properties such as lightweight, high strength, high elasticity, corrosion-resistant, excellent cryogenic performance, and most importantly, the ability to be shaped into highly complex shapes through techniques like thermoplastic forming. Thermoplastic forming techniques include, but not limited to, blow molding, extrusion, shearing, soldering, and over-casting and over-molding.

Despite the highly attractive properties of BMG materials, BMG products are challenging to be realized as flexible elements that possess complex shapes, including a high aspect ratio, thin-walls, and complex features of sidewalls. Such geometries cannot be formed through conventional methods such as casting and injection molding.

SUMMARY OF THE INVENTION

The present invention relates to a flexible BMG element. The flexible BMG element comprises a main body made from a BMG material and may further comprise a flange. The flanges may be made from a BMG material, a non-BMG materials such as steel or stainless steel, or a combination of BMG and non-BMG materials. The main body may comprise at least one opening. The main body may be a thin-walled structure that is compressible, extendable, and/or bendable. A surface of the main body may be corrugated with a series of ridges and furrows.

The main body may comprise a cylindrical component, wherein a surface of the cylindrical component is corrugated.

The main body may comprise a thin-walled polygon-shaped component, wherein a surface of the component is corrugated.

The main body may comprise a thin-walled cylindrical component, wherein a surface of the cylindrical component is a repeating pattern of meshes such that the repeating pattern facilitates the bending of the main body.

The main body may have an inner diameter less than or equal to 6 mm. The inner diameter may be between 0.005 mm and 6 mm.

The main body may be biocompatible and configured to be inserted in a human body.

The main body may have a length-to-outer diameter ratio between 0.25 and 80.

The main body may have an outer diameter-to-wall thickness ratio larger than 8, preferably between 8-2000.

The main body may have a wall thickness between 0.0005 mm and 3 mm.

The main body may comprise a non-flexible component.

The main body may have a wall thickness uniformity under 35% or above 50%, wherein the wall thickness uniformity is defined by $[(t_{max}-t_{min})/t_{min}]*100$ wherein $t_{max}$ and $t_{min}$ are the maximum and the minimum wall thickness, respectively.

The main body may comprise a corrugated portion, wherein the outer diameter of the corrugated portion is not constant along a length direction.

The main body may comprise an origami structure, comprising a crease configured to fold the main body.

The flexible BMG element may be a bellow, a flexible hose, an expansion joint, or a medical stent.

The flexible BMG element may be used to store and/or transfer media. The media may be in the state of gas, liquid, being compressed, or a combination thereof. The media may be air, oxygen, nitrogen, hydrogen, argon, helium, gasoline, or a combination thereof, including compressed hydrogen and cryo-compressed gas.

The BMG material may comprise, as a constituent element, one or more of: Zr, Ti, Ni, Pd, Mg, Al, La, Ce, Fe, Pt, Nb, Ir, Mo, W, Cu, Au, Ag, Hf, Co, Gd, Be, B, C, P, Si, and Rh.

The BMG material may be one of: $Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_8$, $Zr_{57}Nb_5Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_5$, $Zr_{66.4}Nb_{6.4}Cu_{10.5}Ni_{8.7}Al_8$, $Zr_{55}Cu_{30}Al_{10}Ni_5$, $Zr_{46}Cu_{46}Be_8$, $Ti_{41}Zr_{25}Fe_6$, $Ti_{45}Zr_{20}Be_{29}Fe_6$, $Ti_{35}Zr_{30}Be_{25}$, $Ti_{30}Zr_{35}Be_{25}$, $Ti_{40}Zr_{10}Cu_{34}Pd_{14}Sn_2$, $Ti_{40}Zr_{10}Cu_{32}Pd_{14}Sn_4$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_3$, $Ni_{45}Ti_{20}Zr_{25}Al_{10}$, $Ni_{40}Ti_{17}Zr_{28}Al_{10}Cu_5$, $Ni_{62}Pd_{19}Si_2P_{17}$, $Cu_{46}Zr_{42}Al_7Y_5$, $Mg_{65}Cu_{25}Y_{10}$, $Mg_{65}Cu_{7.5}Ni_{7.5}Zn_5Ag_5Y_{10}$, $La_{55}Al_{25}Co_5Cu_{10}Ni_5$, $Fe_{41}Co_7Cr_{15}Mo_{14}C_{15}B_6Y_2$ (in atomic percent), and a mixture thereof.

The flexible BMG element may be made by forming steps comprising: contacting a BMG feedstock and a mold with a cavity and conducting thermoplastic forming to deform the BMG feedstock. The deforming may be conducted to replicate the shape of the cavity. The deforming may be conducted such that the flexible BMG element is seamless in entirety. The thermoplastic forming step may be followed by another thermoplastic forming step configured to further alter the shape of the BMG flexible element and/or improve the performance of the BMG flexible element, the performance being at least one of yield strength, elastic limit, and fatigue endurance. The thermoplastic forming may be based on blow molding, hydroforming, compression molding, or a combination thereof.

The present inventors have found that complex geometries may be thermoplastically formed by limiting the contact between a mold and a BMG feedstock. Subsequently, the as-formed BMG flexible element may be subject to another forming step that can release elastic strain to improve its performance or the shape of the product.

The present inventors have also found that the BMG products of the present invention have a much better fatigue behavior as compared to that of conventional products.

The present inventors have also found that the BMG products of the present invention may be highly flexible and bendable beyond traditional metals. For instance, the BMG products of the present invention may have the maximum elastic strain limit approximately 10 times larger than that of traditional metals. They may also have a high fatigue life and withstand a high pressure. They may be highly corrosion resistant and can be manufactured into highly complex structures that aid engineering designs including a wide range of sizes from small to large.

The thermoplastic forming methods of the present invention allow BMG feedstocks to be shaped seamlessly into thin-walled flexible elements that are free of welds and joints, which act as failure points for most traditional metal bellows and other flexible elements.

DETAILED DESCRIPTION OF THE INVENTION

The present invention relates to a flexible BMG element. The flexible BMG element comprises a main body made from a BMG material and may further comprise a flange. The main body may comprise at least one opening. The main body may be a thin-walled structure that is compressible, extendable, and/or bendable.

The flexible element may have flanges on one or more ends, with a purpose to be connected to assemble with another system. The flexible BMG elements may be free of welded joints in their entirety. The flexible BMG elements may have a geometry of a tube with three or more sided tubes, including a cylinder. It can also be conical and have at least one broken symmetry.

The flexible BMG elements may have an inherent ductile state, a state at which the BMG's fictive temperature is greater than the critical fictive temperature ($T_f > T_f^c$). The fictive temperature is used to characterize the glassy state and the critical fictive temperature is a temperature above which the BMG can deform in a ductile manner. The flexible BMG element may have Young's modulus greater than 10 GPa and yield strength greater than 1200 MPa. The flexible BMG elements may have one or more rotational symmetry along a single axis.

The flexible BMG element may be used to store and/or transfer media. The media may be in the state of gas, liquid, being compressed, or a combination thereof. The media may be air, oxygen, nitrogen, hydrogen, argon, helium, gasoline, or a combination thereof, including compressed hydrogen and cryo-compressed gas.

The flexible BMG elements may be produced through the thermoplastic forming (TPF) process. The TPF may be performed below 800° C., preferably below 700° C. The flexible BMG elements may be thin-walled, hollow shaped, essentially free of welded joints in contrast to conventional metal flexible elements. The BMG flexible element of present invention has one or more openings and can contain a pressurized fluid or gas while at least one of the opening is connected to another component of a system or a subsystem. The BMG flexible elements can be formed through a TPF process in the BMG's supercooled liquid state, and, as a result, the BMG flexible elements have crystallinity of less than 10%. It has been known in the art that BMG materials with crystallinity exceeding 10% suffers from properties deterioration, especially mechanically. A critical capability offered by the present invention is that the TPF-based BMG flexible elements are completely or essentially seamless and stress-free, has a uniform and consistent properties, and has a homogeneous glass state throughout the entire piece.

Moreover, the present inventors found that BMG flexible elements can be made from various BMG alloys but not all BMG alloys. Thermoplastic forming should be done at a low viscosity. However, only very few BMGs exhibit a low viscosity or more precisely a formability which also takes the available time into account. Particularly, BMG flexible element to be made through TPF-based manufacturing approach requires a BMG composition with a sufficient thermoplastic formability. The thermoplastic formability is a standard test used to measure the maximum strain a BMG can undergo in its supercooled liquid state before it eventually crystallizes. Particularly, the formability measures the maximum diameter to which the BMG can be deformed for a standardized set of processing parameters. With BMG with a low thermoplastic formability, the BMG does not have sufficient TPF-compatibility to deform through a TPF technique to achieve the BMG flexible element capturing the aspect ratio and wall thickness requirements. The required thermoplastic formability for the present invention is 3 mm or higher, preferably 6 mm or higher. Example BMG compositions for the present invention include $Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_8$, $Zr_{57}Nb_5Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_5$, $Zr_{66.4}Nb_{6.4}Cu_{10.5}Ni_{8.7}Al_8$, $Zr_{55}Cu_{30}Al_{10}Ni_5$, $Zr_{46}Cu_{46}Be_8$, $Ti_{41}Zr_{25}Be_{28}Fe_6$, $Ti_{45}Zr_{20}Be_{29}Fe_6$, $Ti_{35}Zr_{30}Be_{25}$, $Ti_{30}Zr_{35}Be_{25}$, $Ti_{40}Zr_{10}Cu_{34}Pd_{14}Sn_2$, $Ti_{40}Zr_{10}Cu_{32}Pd_{14}Sn_4$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_3$, $Ni_{45}Ti_{20}Zr_{25}Al_{10}$, $Ni_{40}Ti_{17}Zr_{28}Al_{10}Cu_5$, $Ni_{62}Pd_{19}Si_2P_{17}$, $Cu_{46}Zr_{42}Al_7Y_5$, $Mg_{65}Cu_{25}Y_{10}$, $Mg_{65}Cu_{7.5}Ni_{7.5}Zn_5Ag_5Y_{10}$, $La_{55}Al_{25}Co_5Cu_{10}Ni_5$, $Fe_{41}Co_7Cr_{15}Mo_{14}C_{15}B_6Y_2$.

The BMG material may comprise, as a constituent element, one or more of: Zr, Ti, Ni, Pd, Mg, Al, La, Ce, Fe, Pt, Nb, Ir, Mo, W, Cu, Au, Ag, Hf, Co, Gd, Be, B, C, P, Si, and Rh.

Figure 1:
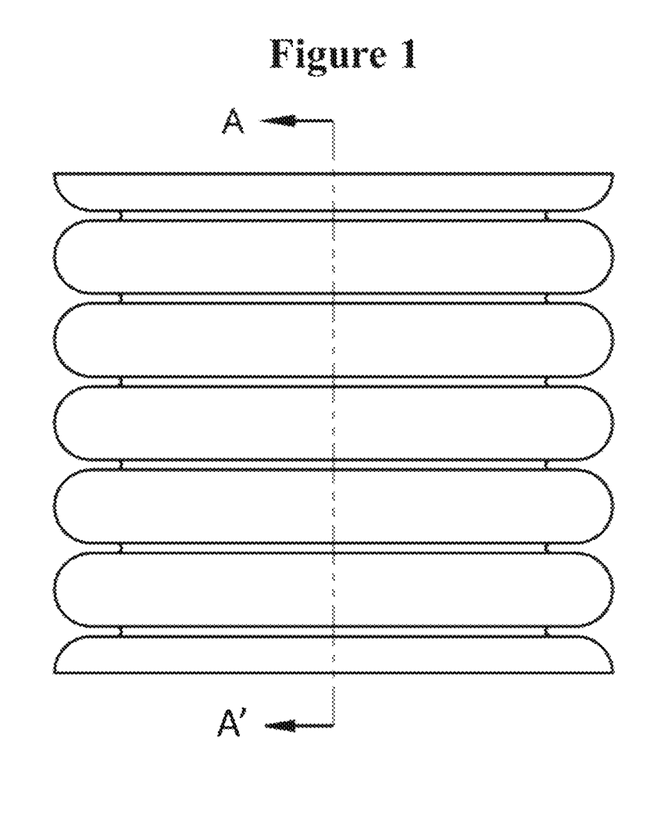
FIG. 1 shows a sketch of one example of the BMG flexible element of the present invention.

FIG. 1 shows a sketch of one example of a BMG flexible element. In one embodiment, the flexible element has a main body with two openings. The main body is made from a BMG material. The main body is a thin-walled cylindrical tube or it has a tube-like structure. The thin wall of the main body has a corrugated structure with a series of ridges and furrows. The BMG flexible element can be compressible, extendable, and bendable.

Figure 2:
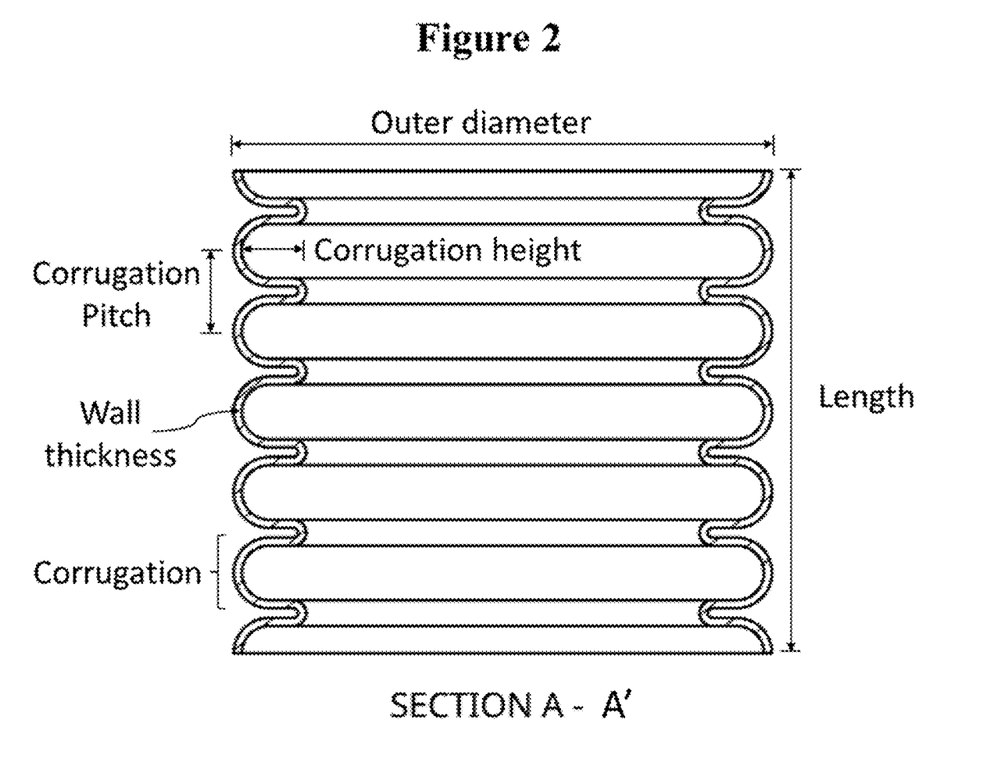
FIG. 2 shows a section A-A' of the BMG flexible element of the present invention of FIG. 1.

Section A-A' in FIG. 2 shows a cross-section of the BMG flexible element highlighting its thin walls wherein the thickness is significantly smaller compared to the other dimensions. The wall thickness of the BMG flexible element may be between 0.0005 mm and 3 mm, more preferably between 0.025 and 0.5 mm. The BMG flexible element may have an outer diameter between 0.0055 mm and 500 mm, preferably 2 mm and 80 mm. The BMG flexible element may have a length-to-outer diameter ratio between 0.25 and 80. The corrugations may have a corrugation pitch-to-height between 0.05 and 10.

Figure 3:
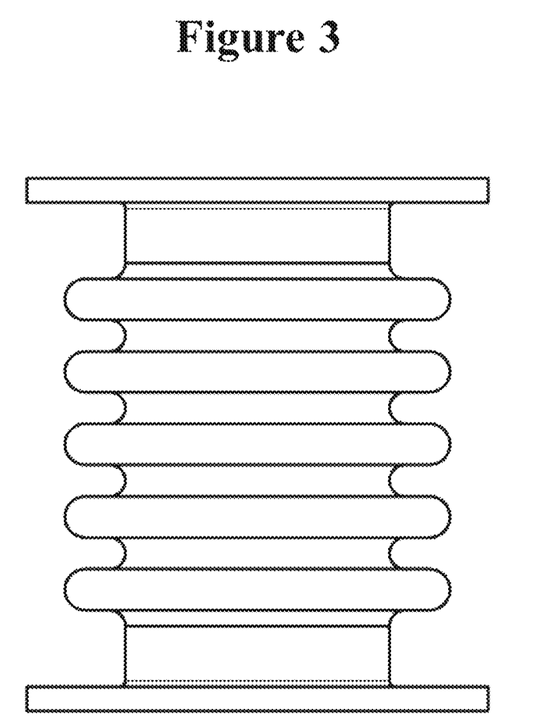
FIG. 3 shows a sketch of one example of a BMG flexible element of the present invention with a main body having two openings with flanges on the two ends for connection to other systems.

As shown in FIG. 3, the flexible element may have a main body with two openings and with flanges on the two ends for connection to other systems. The main body is made from a BMG material. The flanges may be made from a BMG material, a non-BMG materials such as steel or stainless steel, or a combination of BMG and non-BMG materials.

The main body has a thin-walled, cylindrical tube or tube-like structure. The thin wall of the main body has a corrugated structure with a series of ridges and furrows. The BMG flexible element can be compressible, extendable, and/or bendable in the corrugated sections.

Figure 4:
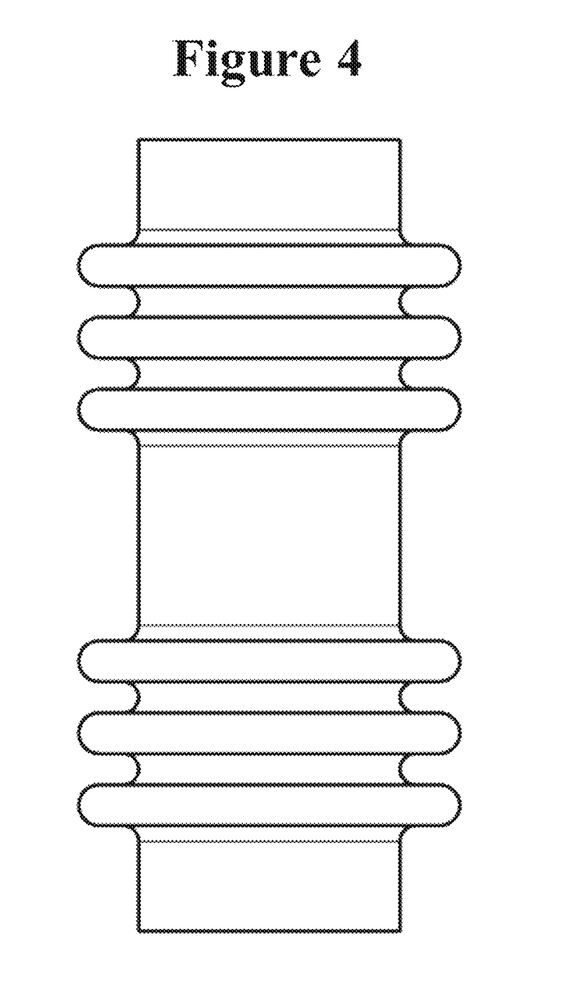
FIG. 4 shows a sketch of one example of a BMG flexible element of the present invention with multiple corrugated sections.

As shown in FIG. 4, the BMG flexible element may have multiple corrugated sections in the main body that may be separated by a rigid non-corrugated section. The BMG flexible element may be compressible, extendable, and/or bendable in the corrugated sections.

Figure 5:
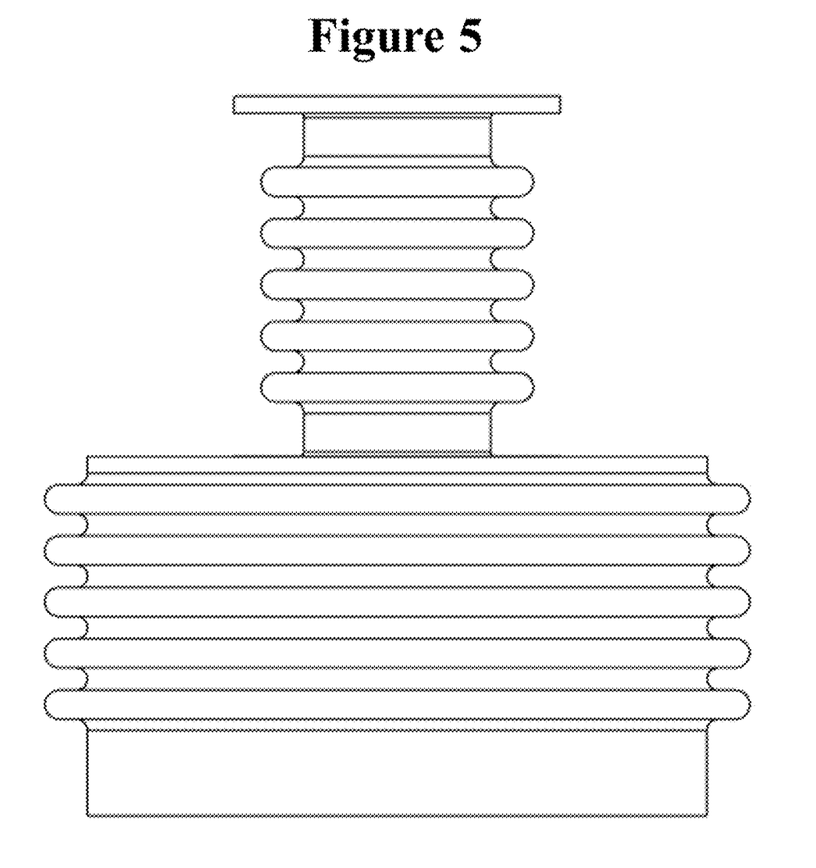
FIG. 5 shows a sketch of one example of a BMG flexible element of the present invention with a non-constant outer diameter in the corrugated section.
Figure 6:
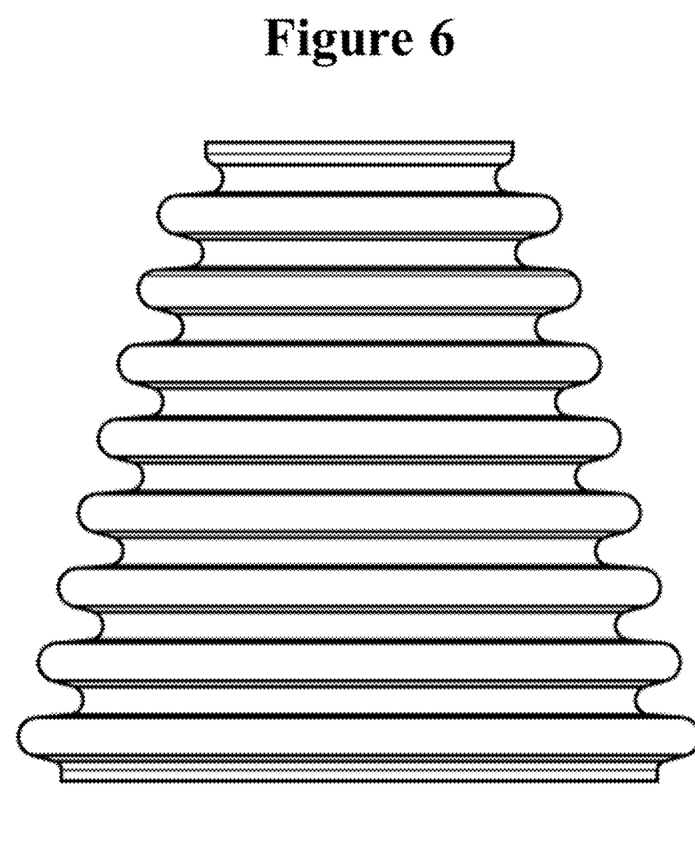
FIG. 6 shows a sketch of one example of a BMG flexible element of the present invention with a non-constant outer diameter in the corrugated section.

As shown in FIGS. 5-6, the BMG flexible element may have a non-constant outer diameter in the corrugated section of the main body throughout its length.

Figure 7:
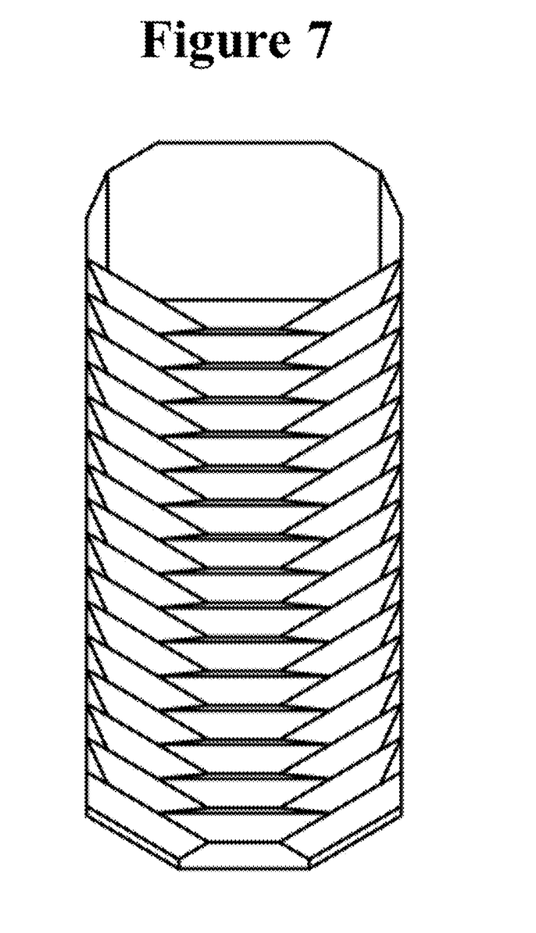
FIG. 7 shows a sketch of one example of a BMG flexible element of the present invention with a thin-walled, non-cylindrical shape.

As shown in FIG. 7, the main body may have a thin-walled, non-cylindrical shape, such as polygons, in the main body. The BMG flexible element may be an origami structure, including features and geometry that allow folding of the element such as creases and non-uniform thickness regions where thinner wall thickness regions allows folding of the structure, making the element flexible, compressible, extendable, and/or bendable.

Figure 8:
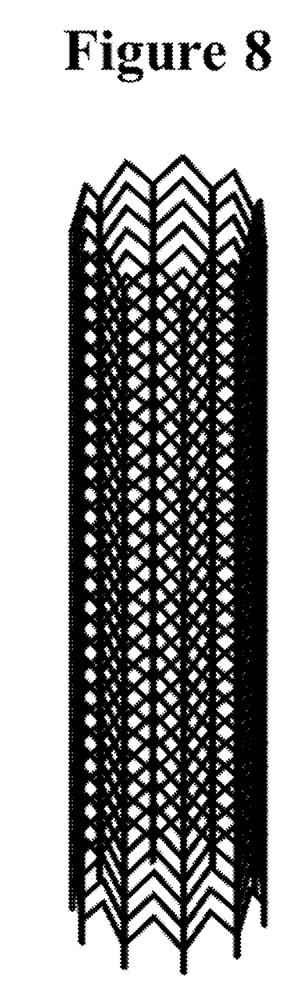
FIG. 8 shows a sketch of one example of a BMG flexible element of the present invention with cylindrical tube or tube-like structure wherein its surface area feature is a repeating pattern of fine meshes.

As shown in FIG. 8, the main body may be hollow in majority and has a thin-walled, cylindrical tube or tube-like structure wherein its surface area feature is a repeating pattern of fine meshes such that the patterns facilitate the bending of the flexible element.

Figure 9:
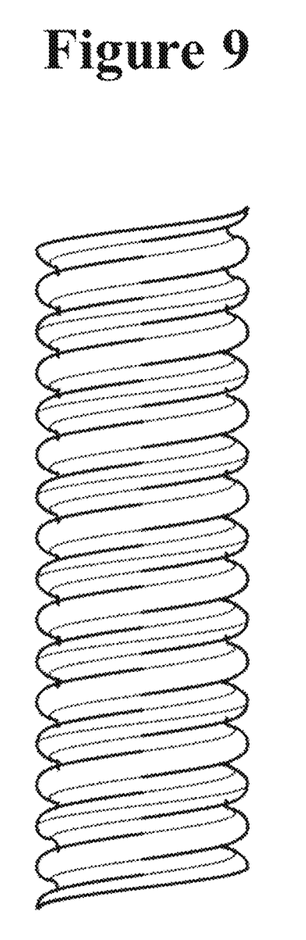
FIG. 9 shows a sketch of one example of a BMG flexible element of the present invention with a corrugated section that is non-perpendicular to the main body's central axis.

As shown in FIG. 9, the main body has a corrugated section that is non-perpendicular to the main body's central axis.

Figure 10:
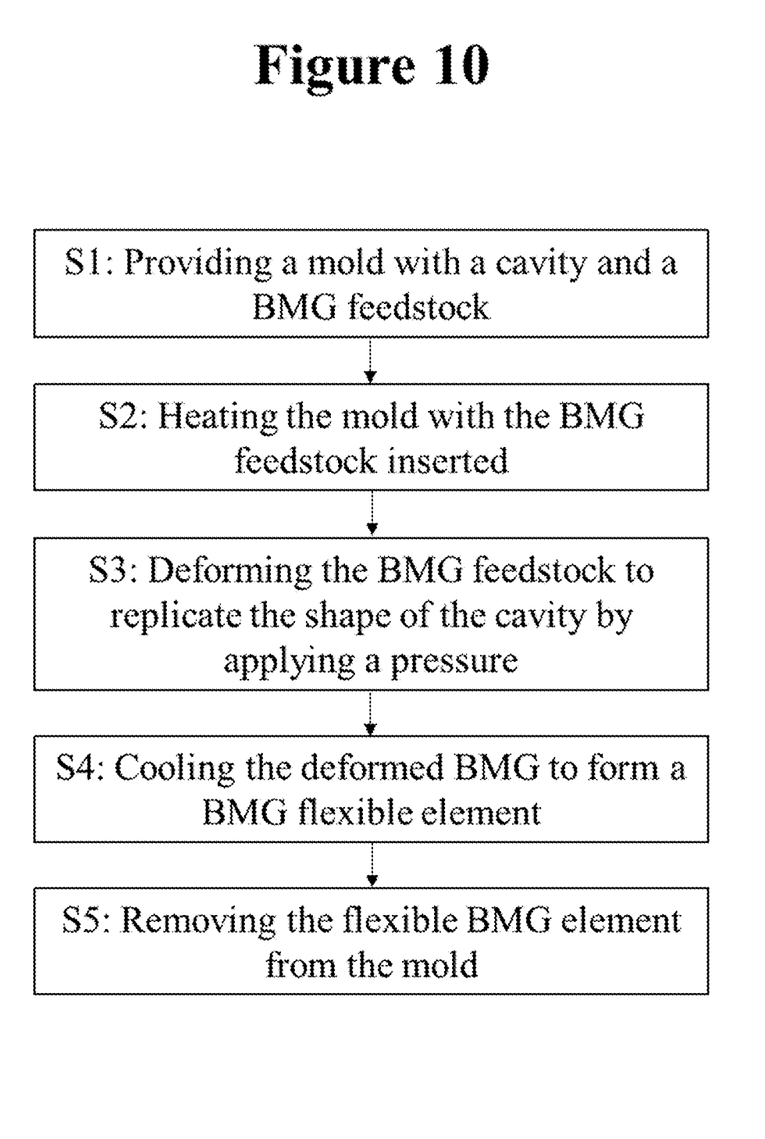
FIG. 10 shows a flow chart for one example forming method of the BMG flexible element of the present invention of the present invention.

Referring to FIG. 10, one example forming method of the BMG flexible element of the present invention, thermoplastic forming (TPF), is described in a flowchart.

In the Step S1, a mold with a cavity with a negative feature of the desired BMG element and a BMG feedstock are provided. The shape of the cavity is selected according to the shape of the BMG flexible element to be formed. The mold may be made of one or more of various materials such as brass, steel, stainless steel, and non-metal such as alumina.

In the Step S2, the mold is heated up to a processing temperature, which is in a supercooled liquid region between the glass transition temperature and the crystallization temperature of the BMG feedstock. The BMG feedstock that is provided separately to the mold is placed on or into the mold cavity, covering the opening of the mold cavity, before or after the mold temperature reaches the processing temperature. The feedstock is heated into its processing temperature.

In the Step S3, after the temperature of the BMG feedstock reaches the processing temperature, which allows the BMG feedstock to become viscous and moldable, a pressure such as gas or liquid pressure is applied to the BMG feedstock such that the BMG feedstock deforms toward the surface of the cavity. The BMG feedstock deforms until reaching the surface of the cavity and replicating the shape of the cavity. The duration of deforming the BMG feedstock, the processing temperature, and the applied pressure are pre-determined to control the thickness, the crystallinity, and other properties of the BMG flexible element to be formed. The deformation duration is selected to be shorter than the amount of time that causes substantial crystallization such that the crystallinity of the BMG flexible element to be formed is minimized to be less than 10%.

In the Step S4, once the BMG feedstock completely fills the cavity of the mold, the deformed BMG is cooled below its glass transition temperature to form a solidified BMG flexible element.

In the Step S5, the BMG pressure vessel is removed from the mold.

In one working example, a Zr-based BMG flexible element is prepared following the steps described in the flow chart of FIG. 10. A steel mold with a negative feature of the desired BMG element is provided. The mold is heated into the supercooled liquid region of the Zr-based BMG alloy between 300° C. and 500° C. Then, the BMG feedstock is inserted into the mold cavity. Pressure between 5 to 500 psi is then applied onto the BMG material causing deformation of the BMG feedstock to replicate the features of the mold, forming the BMG flexible element. Then, the BMG flexible element is cooled below the glass transition temperature under 30° C. to solidify. The BMG flexible element is then removed from the mold.

Figure 11:
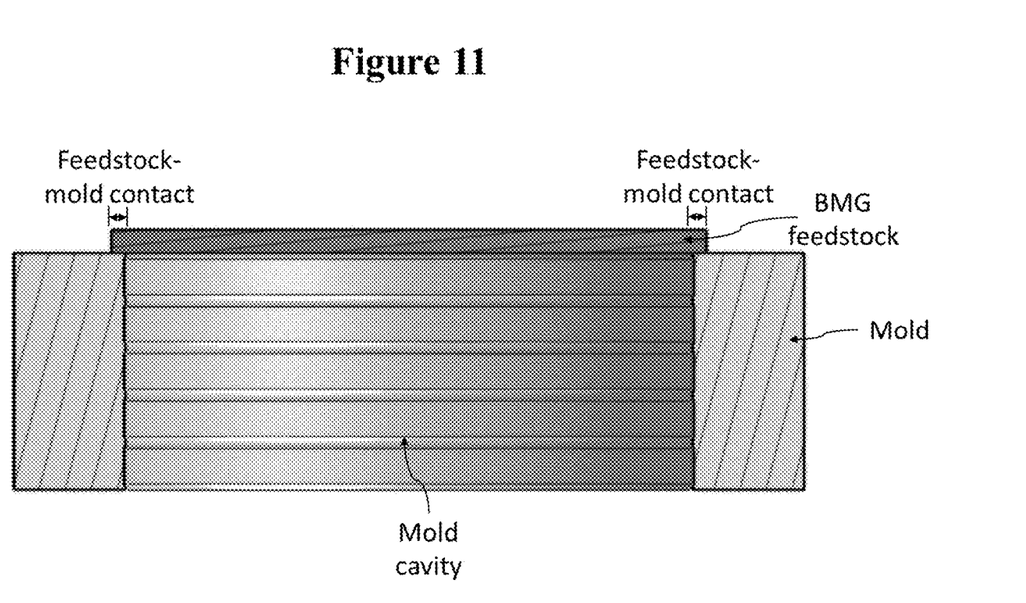
FIG. 11 shows a sketch of the contact between a feedstock and a mold.

The present inventors have found that a BMG flexible element especially ones with complex geometries such as a high aspect ratio or non-uniform wall thicknesses can be thermoplastically formed by controlling the contact area between the mold and the BMG feedstock. The mold-feedstock contact is defined by the surface area where the BMG material is under physical contact with the mold such as shown in FIG. 11. In traditional manufacturing techniques for traditional metals and BMGs, the feedstock-mold contact is high. For example, a mold and a die are assembled prior to manufacturing, leaving a small cavity for the liquid metal to flow into the channel to fabricate the desired element. The present inventors found that this approach cannot achieve the complex structures as described in the above embodiments. Surprisingly, the present inventors found that by minimizing the feedstock-mold contact and utilize external pressure to deform the BMG, a highly complex shapes including flexible elements with a high aspect ratio and engineered non-uniform wall thicknesses can be achieved.

Although only certain embodiments of this invention have been described in detail above, those skilled in the art will readily appreciate that many modifications are possible in the embodiments without materially departing from the novel teachings and advantages of the present invention. Accordingly, all such modifications are intended to be included within the scope of the present invention.

The invention claimed is:

1. A flexible BMG element, the flexible element comprising:
a main body with at least one opening, wherein the main body is made from a BMG material, wherein the main body comprises a thin-walled structure that is compressible, extendable, and/or bendable, and wherein the thin wall is a closed surface such that neither gas nor liquid passes through the thin wall.

2. The flexible BMG element of claim 1, wherein the main body comprises a cylindrical component, wherein a surface of the cylindrical component is corrugated.

3. The flexible BMG element of claim 1, wherein the main body comprises a thin-walled polygon-shaped component, wherein a surface of the component is corrugated.

4. The flexible BMG element of claim 1, wherein the main body is a thin-walled cylindrical component, wherein a surface of the cylindrical component is a repeating pattern of fine meshes such that the repeating pattern facilitates the bending of the main body.

5. The flexible BMG element of claim 4, wherein the main body has an inner diameter less than or equal to 6 mm and wherein the main body is biocompatible and configured to be inserted in a human body.

6. The flexible BMG element of claim 1, wherein the main body has a length-to-outer diameter ratio between 0.25 and 80.

7. The flexible BMG element of claim 1, wherein the main body has an outer diameter-to-wall thickness ratio larger than 8.

8. The flexible BMG element of claim 1, wherein the main body has a wall thickness between 0.0005 mm and 3 mm.

9. The flexible BMG element of claim 1, wherein the BMG material used to manufacture the main body has formability of 3 mm or higher.

10. The flexible BMG element in claim 1, wherein the main body comprises a non-flexible component.

11. The flexible BMG element of claim 1, wherein a wall thickness uniformity of the main body is under 35% or above 50%, wherein the wall thickness uniformity is defined by $[(t_{max}-t_{min})/t_{min}]*100$, wherein $t_{max}$ and $t_{min}$ are the maximum and the minimum wall thickness, respectively.

12. The flexible BMG element in claim 1, wherein the main body comprises a corrugated portion and the outer diameter of the corrugated portion is not constant along a length direction.

13. The flexible BMG element in claim 1, wherein the main body comprises an origami structure, comprising a crease configured to fold the main body.

14. The flexible BMG element of claim 1, wherein the flexible BMG element is a bellow, a flexible hose, an expansion joint, or a medical stent.

15. The flexible BMG element of claim 1, wherein the flexible BMG element is used to store and/or transfer media.

16. The flexible BMG element of claim 1, wherein the BMG material comprises, as a constituent element, one or more of: Zr, Ti, Ni, Pd, Mg, Al, La, Ce, Fe, Pt, Nb, Ir, Mo, W, Cu, Au, Ag, Hf, Co, Gd, Be, B, C, P, Si, and Rh.

17. The flexible BMG element of claim 1, wherein the BMG material is one of: $Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_8$, $Zr_{57}Nb_5Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_5$, $Zr_{66.4}Nb_{6.4}Cu_{10.5}Ni_{8.7}Al_8$, $Zr_{55}Cu_{30}Al_{10}Ni_5$, $Zr_{46}Cu_{46}Be_8$, $Ti_{41}Zr_{25}Fe_6$, $Ti_{45}Zr_{20}Be_{29}Fe_6$, $Ti_{35}Zr_{30}Be_{25}$, $Ti_{30}Zr_{35}Be_{25}$, $Ti_{40}Zr_{10}Cu_{34}Pd_{14}Sn_2$, $Ti_{40}Zr_{10}Cu_{32}Pd_{14}Sn_4$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_3$, $Ni_{45}Ti_{20}Zr_{25}Al_{10}$, $Ni_{40}Ti_{17}Zr_{28}Al_{10}Cu_5$, $Ni_{62}Pd_{19}Si_2P_{17}$, $Cu_{46}Zr_{42}Al_7Y_5$, $Mg_{65}Cu_{25}Y_{10}$, $Mg_{65}Cu_{7.5}Ni_{7.5}Zn_5Ag_5Y_{10}$, $La_{55}Al_{25}Co_5Cu_{10}Ni_5$, $Fe_{41}Co_7Cr_{15}Mo_{14}C_{15}B_6Y_2$ (in atomic percent), and a mixture thereof.

18. The flexible BMG element of claim 1, the flexible BMG element is made by forming steps comprising: contacting a BMG feedstock and a mold with a cavity and conducting thermoplastic forming to deform the BMG feedstock to replicate the shape of the cavity such that the flexible BMG element is seamless in entirety.

19. The flexible BMG element of claim 18, wherein 80% of the flexible BMG element is made through the thermoplastic forming, and wherein the thermoplastic forming is based on blow molding, hydroforming, compression molding, or a combination thereof.

20. The flexible BMG element of claim 18, wherein the thermoplastic forming step is followed by another thermoplastic forming step configured to further alter the shape of the BMG flexible element and/or improve the performance of the BMG flexible element, the performance being at least one of yield strength, elastic limit, and fatigue endurance.

21. A flexible BMG element, the flexible element comprising:
a main body with at least one opening, wherein the main body is made from a BMG material, wherein the main body comprises a thin-walled structure that is compressible, extendable, and/or bendable, and wherein a wall thickness uniformity of the main body is under 35% or above 50%, wherein the wall thickness uniformity is defined by $[(t_{max}-t_{min})/t_{min}]*100$, wherein $t_{max}$ and $t_{min}$ are the maximum and the minimum wall thickness, respectively.

* * * * *